United States Patent Office 3,360,346
Patented Dec. 26, 1967

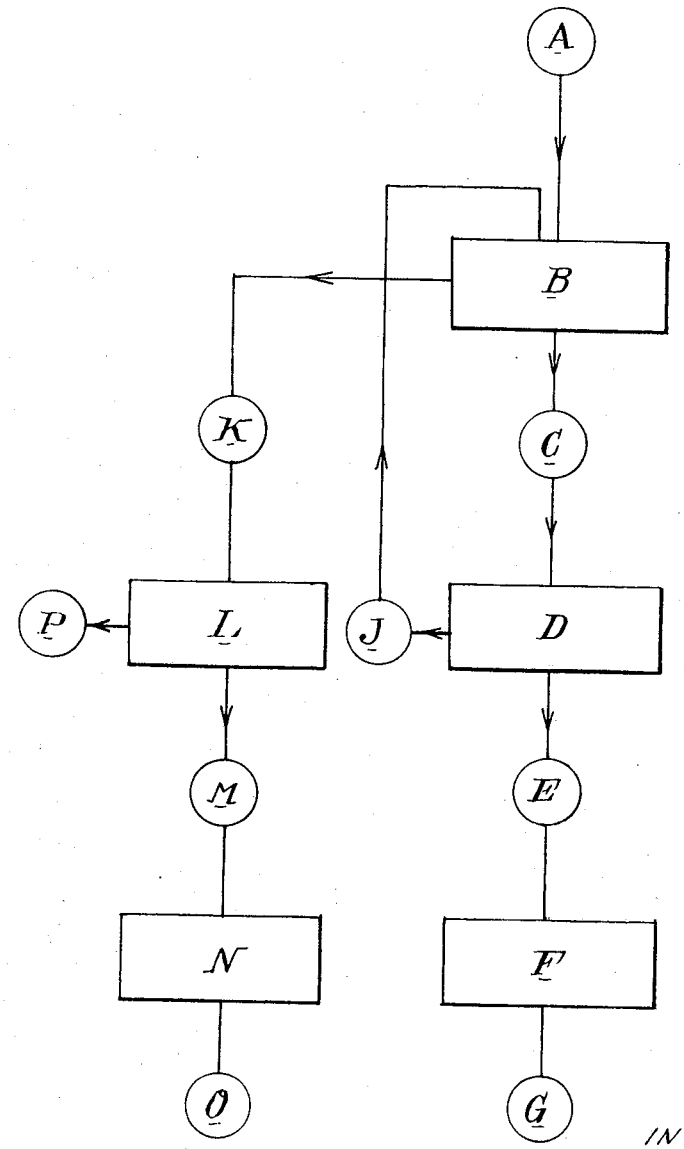

3,360,346
PROCESS OF SEPARATION OF URANIUM AND THORIUM STARTING FROM A SOLUTION CONTAINING THESE TWO ELEMENTS
Henri Huet, Saint-Vrain, Christian Lorrain, Ballancourt, René Mahut, Voix, René Mariette, Ballancourt, and Paul Vertes, Antony, France, assignors to Commissariat à l'Energie Atomique, Paris, France, an organization of France
Filed Feb. 12, 1965, Ser. No. 432,231
Claims priority, application France, Feb. 14, 1964, 963,769
9 Claims. (Cl. 23—341)

The invention relates to a process of separation of uranium and thorium starting from aqueous solutions of uranyl nitrate and thorium nitrate.

It is known to separate such elements through selective extractions with organic phases such as solutions of tributyl-phosphate, which will be hereafter referred to under the letters TBP for the ease of the language, starting however from aqueous solutions of nitrates wherein the ratio of the thorium content to the uranium content is less than 2%. These known processes comprise usually the steps of:

Subjecting the aqueous solution feed to an extraction treatment with an organic phase or solution of TBP whereby the uranium passes into the organic phase;

Scrubbing the organic phase with a solution of nitric acid or uranyl nitrate or even with pure water whereby all the impurities, including some of the thorium which passed into the organic phase, are reextracted in this last aqueous phase;

Stripping the organic phase with demineralized or distilled water to recover an aqueous solution of a uranyl nitrate of nuclear purity. There is no standard definition of the terms "nuclear purity." Under these words, it is to be understood that the uranium obtained contains less than 100 p.p.m. and preferably less than 50 p.p.m. of thorium.

Such process however is limited to solution feeds where the ratio of thorium with respect to the uranium is less than about 2%.

When the same process is applied to aqueous feeds containing these two elementes in a ratio of thorium to uranium higher than 2% it is impossible to prevent the passage of substantial amounts of thorium into the organic phase during the first above described step and to obtain an organic phase of pure uranyl nitrate after the scrubbing of said organic phase with a solution of nitric acid according to the second above described step. Thus when stripping the organic phase with demineralized or distilled water to recover the uranium in the form of an aqueous solution the latter is then soiled with thorium and has not the above mentioned "nuclear purity."

For these reasons, in order to treat solution feeds of uranyl nitrate and thorium nitrate containing more than 2% of thorium with respect to the uranium it was necessary heretofore, in a first cycle of operations, to reduce the content in thorium nitrate of the solution to a sufficient low value, to enable the above described separation process in a second cycle of operations, for instance as follows:

Either the thorium of such solution feeds is precipitated under the form of a salt such as the sulfate or the oxalate which are soluble in the presence of uranyl nitrate; in this case the thorium precipitate must be separated by filtration and further treated to recover the thorium;

(instead of precipitating the thorium of the aqueous phase one could also precipitate the uranium in the form of a salt which should then be redissolved in view of the above extraction process).

Or most of the uranium of the starting aqueous feeds is extracted by means of an organic solvent which will also extract a part of the thorium from said feeds, the organic phase obtained being then stripped with an aqueous phase to recover the whole uranyl nitrate with said parts of thorium in an aqueous phase. Such a stripping however requires very important amounts of water, said aqueous phase having to be subsequently concentrated through evaporation to avoid the handling of too important volumes of liquid.

Other methods have been suggested for the separation of the uranium and of the thorium, which methods comprise essentially complexing all the thorium contained in the starting aqueous feeds in the form of phosphates or sulfates prior to the extraction of the uranium by a solution of TBP. However in these methods also a substantial part of the uranium is transformed into complexes which remain in the aqueous phase, the recovery of the uranium from said complexes by decomposition thereof with large amounts of nitric acid being difficult and costly.

It is then clear that all these methods are expensive and require the use of important amounts of reactives and of energy.

The object of the invention is to overcome all these inconveniences and to obtain a uranium of nuclear purity by a rapid and economical treatment of aqueous feeds of uranyl nitrate and of thorium nitrate wherein the respective proportions of the uranium and of the thorium may vary in very wide ranges regardless of the value of their ratio, in particular when the ratio of thorium to uranium is more than 2% and, if the case should be, in the presence of other nitrates.

Another object of the invention is to provide a process permitting a recovery of more than 99.9% of the uranium originally present in the starting aqueous feed.

Other objects of the invention will become apparent as the following description proceeds.

The process of the invention comprises essentially the steps of subjecting said aqueous feeds of uranyl nitrate and thorium nitrate to an extraction by an organic phase of TBP diluted in a solvent such as kerosene under conditions such as to obtain a maximum concentration close to the theoretical saturation of uranium in the organic phase, scrubbing said organic phase with a solution of nitric acid or a solution of uranium nitrate rendered acid by addition of some nitric acid, such scrubbing solution containing complexing ions for the thorium in amounts sufficiently small to preserve the saturation of the organic phase in uranium and recovering the uranium from the organic phase.

This process which will be described with more details hereunder can be carried out starting from any solutions of uranium nitrate and thorium nitrate, in particular from concentrated nitric solutions such as obtained by the treatment with concentrated nitric acid of thorianite ores which contain very important and variable amounts of thorium together with uranium. These concentrates may contain from 25 to 150 g. of uranium per liter together with amounts of thorium varying from 300 to 100 g. of thorium per liter.

In connection with the above conditions it has been found that, when subjecting such concentrated nitric solutions of uranium and thorium to an extraction with TBP, the thorium nitrate had a salting out action, from the aqueous solution, on the uranium nitrate which passes into the TBP organic phase. The greater the concentration of thorium nitrate in the aqueous phase the better the salting out of the uranium nitrate from the aqueous phase into the organic phase. Other nitrates such as the aluminum nitrate, the nitrates of alkaline metals and the nitric acid itself contained in an aqueous feed of uranyl and thorium nitrates can act also as salting out agents for the uranium. Such nitrates may even be added in the case of a starting aqueous feed having a low content in thorium nitrates. However, nitrates of aluminum or of rare earths of a sufficient purity are rarely available and the process according to the invention becomes particularly interesting for feeds having higher concentrations in thorium. The organic phase for extracting the uranium from the starting aqueous feed is constituted by solutions of TBP in kerosene or in other inert solvents as well known by the man skilled in the art.

The choice of the concentration of the TBP in the organic phase will also depend upon the concentration of uranium in the starting aqueous feed. The less the concentration of the starting feed in uranium the less the concentration of TBP in the organic phase in order to, on the one hand, increase its selectivity with respect to the uranium and, on the other hand, to provide for a volume of organic phase sufficient to ensure a satisfactory contact with the aqueous phase. The concentrations of the TBP in the organic phase will currently vary from about 10% to 40% of TBP. Organic phases with higher concentrations in TBP are difficult to use owing to their high viscosity.

The proportions of the volumes or flows of respectively the starting aqueous feed and of the organic phase must be controlled closely, in conformity with the apparatus used, for obtaining an organic phase having a maximum concentration in uranium, close to its theoretical saturation.

In addition to the control of the compositions of the phases and the determination of their respective volumes for obtaining an extraction of the uranium from the aqueous phase and the forming of an organic phase containing uranium in a concentration close to the saturation, many other factors, inter alia the temperature of the TBP solution, the structure of the apparatus in which the process according to the invention is carried out, in particular the number of extraction stages in said apparatus, should be taken in account as well known by the man skilled in the art.

However irrespective of the composition of the starting feed which can vary for instance in the wide ranges set forth above, the yield of extraction of the uranium by the organic phase is always superior to 99.9% and the content in thorium of said organic phase practically saturated in uranium is about 0.5% as compared to the uranium content, if the conditions of extraction have been chosen so as to obtain an organic phase practically saturated with uranium.

According to the following step of the invention the organic phase saturated in uranium is scrubbed with an aqueous solution either of nitric acid or of a uranyl nitrate acidified with some nitric acid, this solution containing moreover preferably minor amounts of complexing ions for the thorium such as sulfates, phosphates, fluorides, oxalates.

When contacting the organic phase practically saturated in uranium and containing small amounts of thorium with the scrubbing aqueous solution the thorium is caused to pass into said scrubbing aqueous solution while the uranyl nitrate or the nitric acid of said scrubbing aqueous solution causes the uranium to remain in the organic phase. As long as the organic phase remains saturated in uranium all of the thorium present in this organic phase tends to pass into the aqueous solution.

When the aqueous scrubbing solution is constituted by nitric acid alone, the concentration thereof should range from approximately two normalities to four or five normalities or even more.

Of course it is economically advantageous to use the lowest concentrations preferably a concentration of about 2 N.

Said scrubbing aqueous solution may advantageously be constituted of uranyl nitrate and concentrations of uranyl nitrate of about 125 g. per liter give excellent results. Irrespective of their concentrations in uranyl nitrate such scrubbing solution must be acidified to a certain extent by nitric acid. It has been found that in the absence of said acidification precipitates appear at the interface of the aqueous and organic phases and the emulsions are difficult to settle, and when separating the two phases one from another, each phase carries away mechanically minor amounts of the respective other phase. All these inconveniences are removed when acidifying a little this uranyl nitrate with nitric acid. A 0.5 N concentration in nitric acid of said scrubbing solution of uranyl nitrate appears as very practical.

It can be mentioned that the uranyl nitrates used to constitute the scrubbing solution can be provided economically and industrially by a part of the production which is recycled. It would be possible also to use instead of uranyl nitrate other nitrates such as aluminum nitrate or nitrates of alkaline metals.

However, as a general rule the other nitrates are less interesting than the uranyl nitrate owing to the fact that they are not usually available with a sufficient degree of purity.

In the absence of minor amounts of ions likely to complex the thorium one can obtain after the scrubbing step organic phases of highly purified uranium. Their content in thorium can drop as low as 50 p.p.m. with respect to their uranium content. However such results are not constant since these thorium proportions may rise up to several hundreds of p.p.m. from one batch to another.

It has been found, when the above described aqueous scrubbing solutions contain minor amounts, as low as 50 to 100 mg. per liter of solution, of sulfate, phosphate, oxalate or fluoride ions, which are known to form complexes with the thorium, that organic phases of uranium having a nuclear purity are obtained constantly in a very reproductible manner.

These small amounts of salt ions are believed to compensate the complexing action with respect to the thorium of minor amounts of monobutyl- and dibutyl-phosphates resulting from the degradation of minor amounts of TBP during the scrubbing of the organic phase with the nitric acid or uranyl nitrate aqueous solution.

The complexes that said dibutyl- and monobutyl-phosphates are likely to form with minor amounts of the thorium present in the organic phase would remain in the organic phase in the absence of minor amounts of ions such as the sulfate, phosphate, fluoride, oxalate ions having a greater affinity for thorium. These ions would displace the minor amounts of thorium retained in these complexes into phosphate, sulfate, fluoride or oxalate complexes passing into the aqueous phase.

Of course these concentrations of phosphate, sulfate, fluoride, oxalate ions could be increased but the danger would appear that minor amounts of uranium would be complexed too, such complexed uranium passing then into the aqueous solution. This would have the effect of decreasing the saturation in uranium of the organic phase thereby rendering possible the return, from the aqueous solution into the organic phase of minor amounts of thorium sufficient to destroy the desired nuclear purity specifications of the final uranium.

The appended flow sheet shows in a diagrammatical manner how a complete process according to the invention may be carried out. On this flow sheet A designates the starting aqueous feed containing the uranyl and thorium nitrates resulting, for instance, from the treatment of a thorianite ore with nitric acid, after removal of the unattacked insoluble substances by filtration. The aqueous phase is first subjected in B to the extraction step with a TBP organic phase for instance in an extraction apparatus comprising a series of mixing-decanting vessels.

The saturation of the organic phase in these mixing-decanting vessels may be followed by the variations of the densities of the organic phases in the successive vessels.

The conditions as set forth hereabove for the extraction are established in function of the original composition of the aqueous starting feed to obtain an organic phase containing more than 99.9% of the uranyl nitrate and a content of thorium less than 0.5% with respect to said uranium content. This organic phase is shown on the flow sheet in C.

The aqueous phase obtained after separation of the organic phase is represented by K and contains practically all of the original thorium nitrate and minor amounts of uranyl nitrate. Said organic phase C is then subjected, in a scrubbing apparatus consisting for instance of a series of mixing-decanting vessels, designated by D, to the above mentioned scrubbing with a solution either of nitric acid or of uranyl nitrate acidified by some nitric acid and containing minor amounts of at least one of the ions selected from the group constituted of the sulfate, phosphate, oxalate and fluoride ions.

After said scrubbing an organic phase represented by E on the flow sheet and containing only uranyl nitrate is separated from the aqueous phase J containing the thorium nitrate extracted from the organic phase C as well as traces of uranyl nitrates.

This aqueous phase J is then recycled and fed to the apparatus B together with the starting feed A. The organic phase E is fed to a reextraction or stripping apparatus working with distilled or demineralized and preferably hot water to recover the uranyl nitrate having nuclear purity under the form of an aqueous solution G, whereas the TBP organic phase removed from the apparatus F can be recycled to the apparatus B and used again, for a new extraction of uranium from a new batch of aqueous feed of nitrates A, however preferably after a washing with carbonates in order to remove the degradation products of the TBP.

The traces of uranyl nitrate which where carried away with the aqueous solution K remaining after extraction of the uranyl nitrate from the starting feed A can also be recovered in the course of the recovery of pure thorium contained in said solution K.

This extraction of thorium can proceed in the following manner. The solution K is subjected, in an apparatus L comprising for instance a series of mixing-decanting vessels, to an extraction step, with TBP, in order to obtain, on the one hand, an organic phase M containing the thorium nitrate and the traces of uranyl nitrate which were contained in the phase K and, on the other hand, an aqueous phase P containing as well the impurities and the nitric acid of A as the small amounts of complexing ions and some of the nitric acid recovered at the level of the scrubbing step in the apparatus D.

The aqueous phase P is rejected and the organic phase M is subjected, for instance in a reextraction apparatus N comprising a series of decanting-mixing vessels, to a treatment with deminearalized water whereby an aqueous solution O containing the thorium nitrate and traces of uranyl nitrate is obtained.

Finally said traces of uranyl nitrate are separated through evaporation of the solution and crystallisation; said uranyl nitrate being recycled together with the aqueous feed A in the extraction apparatus B.

The thorium nitrate can be recovered in the form of crystals having a nuclear purity.

Several examples of the present invention will be described hereinafter merely to illustrate the same.

EXAMPLE I

The extraction of the uranyl nitrate is carried out starting from a nitric feed solution resulting from the treatment of an uranium ore with nitric acid, after removal by filtration of the insoluble compounds, such feed solution being characterized as follows:

Density: 1.528
Acidity: 1.30 nitric normalities
Content in:
    Uranium _____g./l__ 100
    Thorium _____g./l__ 165
    Lead _____g./l__ 7.15
    Iron _____g./l__ 10.3
    Phosphates _____g./l. (counted as $P_2O_5$)__ 7.5
    Silica _____mg./l__ 300
    Sulfates _____mg./l. (as $SO_3$)__ 600
    Oxides of rare earths _____mg./l__ 500

This feed is treated with TBP in a series of eight mixing-decanting vessels, with a solution of 33% in volume of TBP in kerosene.

After the extraction of the uranium from said aqueous feed the organic phase obtained, containing 135 g. per liter of uranium, is subjected to a countercurrent scrubbing in a series of five mixing-decanting vessels with an aqueous solution having the following characteristics:

Density: 1.175
Acidity: $NO_3H$ 2 N
Content in:
    Uranium _____g./l__ 80
    Sulfuric acid _____mg./l__ 100

The volumetric ratio of the aqueous scrubbing solution to the organic phase is of 0.20.

Thereafter the organic phase is subjected to a reextraction or stripping treatment with demineralized water at the temperature of 60° C. An aqueous solution of uranyl nitrate of high purity is obtained, said solution having the following characteristics:

Density: 1.120
Acidity: 0.05 Nitric Normality
Content in:
    Uranium _____g./l___ 0.85
    Thorium _____mg./l___ 0.8

All the other elements, if any, are present in the solution under the form of traces in concentrations below the limits of detection of the spectrographic methods.

EXAMPLE II

This example relates to the industrial preparation of uranium salts and thorium salt of high purity starting from ores of uranothorianite previously dried and comminuted and finally dissolved in boiling nitric acid. After filtration of the soluble products remaining after this nitric treatment, impure solutions of nitrates containing from 40 to 100 g./l. of uranium and 150 to 250 g./l. of thorium as well as numerous impurities such as iron, lead, radium, rare earths, etc., are obtained.

These solutions are then subjected to the operations of separation and purification of the uranium in conditions analogous to those set forth in Example I.

The aqueous phase K of nitrate which has been freed of the uranium, and which contains practically all the thorium nitrate previously present in the aqueous feed A, is subjected to an extration with a solution of 45% in volume of TBP in dodecane, the volumetric ratio of the organic phase to the aqueous phase being equal to 1.8.

The organic phase M obtained is treated with demineralized water (in the apparatus N) the volumetric ratio between said two phases being equal to 1; the aqueous solution of pure thorium nitrate obtained is concentrated by evaporation and the crystals of very pure thorium nitrate obtained are dried. This process permits then to obtain in very economical conditions uranium nitrate and thorium nitrate having both a nuclear purity as shown below by their analytic compressions:

| Elements | I. Uranyl Nitrate "Nuclear Purity" (quantities in parts per million) | Elements | II. Thorium nitrate in Crystals (quantities in parts per million) |
|---|---|---|---|
| Ag | Less than 1 | B | Less than 0.1 |
| B | Less than 0.1 | Cr | Less than 5. |
| Cr | Less than 5 | Cu | Less than 5. |
| Cu | Less than 2 | Fe | Less than 30. |
| Fe | Less than 20 | Mn | Less than 5. |
| P | Less than 5 | Ni | Less than 5. |
| Mn | Less than 5 | P | Less than 5. |
| Mo | Less than 5 | Si | Less than 10. |
| Ni | Less than 5 | U | Less than 50. |
| Si | Less than 20 | Oxides of rare earths. | 15. |
| Th | Less than 50 | | |

EXAMPLE III

The process according to the present invention is applied to a nitric feed resulting from the treatment of a uranium ore and which, after filtration of the insoluble products, is characterized as follows:

Density: 1.590
Free acidity: 1.25 Nitric Normalities
Content in:
Uranium _____ g./l.__ 57.8
Thorium _____ g./l.__ 251.3
Lead _____ g./l.__ 10.2
Iron _____ g./l.__ 5.5
Phosphates _____ mg./l. (as $P_2O_5$)__ 229
Silica _____ mg./l. (as $SiO_2$) less than__ 10
Sulfates _____ m./l. (as $SO_3$) less than__ 10
Oxides of rare earths _____ g./l.__ 3.9

This solution is treated in a series of eight mixing-decanting vessels, with a phase containing 27.5% in volume of TBP in kerosene. After extraction of all the uranium from the aqueous feed, the organic phase which contains 112 g./l. of uranium is subjected to a countercurrent scrubbing in a series of six mixing-decanting vessels with an aqueous solution, the volumetric ratio of which to said organic phase is equal to 0.35, said aqueous solution being characterized as follows:

Density: 1.192
Acidity: 3.50 Nitric Normalities
Uranium: 55 g./l.
Phosphoric acid: 50 mg./l.

The organic phase is stripped with demineralized water at a temperature of 65° C. and a solution of uranium nitrate of high purity is obtained. Said aqueous solution is characterized as follows:

Density: 1.120
Acidity: 0.10 Nitric Normalities
Content in:
Uranium _____ g./l.__ 65
Thorium _____ mg./l.__ 1.6

All the other elements are present in this solution in amounts inferior to the limits likely to be detected by spectrographic analytic methods.

The aqueous phase K containing practically all the thorium initially present in the feed A after the extraction of the thorium nitrate is characterized as follows:

Density: 1.480
Acidity: 1.55 Nitric Normalities
Content in:
Uranium _____ mg./l.__ 57
Thorium _____ g./l.__ 218
Lead _____ g./l.__ 9.1
Iron _____ g./l.__ 4.8
Phosphates _____ mg./l.__ 200
Silica _____ mg./l. (as $P_2O_3$) less than__ 10
Sulfates _____ mg./l. (as $SO_3$) less than__ 10
Oxides of rare earths _____ g./l.__ 3.4

The thorium can be recovered from this solution by known methods for instance the one described hereabove.

In a general manner while the above description discloses what is deemed to be practical and efficient embodiments of the present invention, said invention is not limited thereto as there might be changes made in the procedure and composition of the products described without departing from the principle of the present invention as comprehended within the scope of the appended claims.

What we claim is:

1. In a method for the separation of uranium and of thorium from an aqueous feed of their nitrates which comprises subjecting said aqueous feed to an extraction by a solution of tributylphosphate in an organic medium the improvement comprising selective extraction of the uranium by controlling the respective volumes of the organic solution and said aqueous feed in such manner that the concentration in uranium of the organic solution is close to its theoretical saturation, scrubbing said organic solution with an aqueous solution selected from the class of a solution of nitric acid, a solution of uranyl nitrate acidified by nitric acid and mixtures thereof, and recovering the uranium from said organic phase.

2. In a method for the extraction of uranium and thorium from an aqueous feed which comprises subjecting said aqueous feed to an extraction with a solution of tributylphosphate in an organic medium, the improvement comprising selective extraction of the uranium by controlling the respective volumes of said organic phase and said aqueous feed in such manner that the concentration in uranium of the organic phase is close to its theoretical saturation, scrubbing said organic phase with an aqueous solution selected from the class of a solution of nitric acid, a solution of uranyl nitrate acidified by nitric acid, and mixtures thereof, said aqueous solution containing complexing ions for the thorium in an amount sufficiently small to maintain the organic phase substantially saturated with uranium and recovering the uranium from said organic phase.

3. In a method for the separation of uranium and of thorium from an aqueous feed of their nitrates which comprises subjecting said aqueous feed to an extraction by a solution of tributylphosphate in an organic medium, the improvement comprising subjecting said aqueous feed to a selective extraction for uranium with an organic solution of about 10% to about 40% tributylphosphate in kerosene, controlling the respective volumes of the organic solution and said aqueous feed in such manner that the concentration in uranium of the organic solution is close to its theoretical saturation, scrubbing said organic solution with an aqueous solution selected from the class consisting of a solution of nitric acid, a solution of uranyl nitrate acidified by nitric acid and mixtures thereof, said aqueous solution containing complexing ions of the thorium selected from the group consisting of phosphates, sulfates, fluorides, oxalates, and mixtures thereof in amounts sufficiently small to keep the organic phase saturated with uranium and stripping the uranium of said organic phase with water free from salts.

4. The improved method of claim 3 wherein the concentrations of the complexing ions of the thorium in said scrubbing aqueous solutions range from about 50 to about 100 milligrams per liter.

5. The improved method of claim 3 wherein said complexing ions of the thorium consist of phosphate ions.

6. The improved method of claim 3 wherein said complexing ions of the thorium consist of sulfate ions.

7. The improved method of claim 3 wherein said scrubbing aqueous solution consists of a solution of nitric acid the concentration of which is at least of about two normalities.

8. The improved method of claim 3 wherein said scrubbing aqueous solution consists of a solution of uranyl nitrate acidified with nitric acid in a concentration of about 0.5 normalities.

9. The improved method of claim 3 wherein part of the uranium in the form of uranyl nitrate recovered by said method is used to constitute the aqueous solution of uranyl nitrate for the scrubbing of a new batch of said organic phase.

References Cited

UNITED STATES PATENTS

| | | | |
|---|---|---|---|
| 2,897,046 | 7/1959 | Bohlmann | 23—341 |
| 2,943,923 | 7/1960 | Morgan | 23—341 X |

L. DEWAYNE RUTLEDGE, *Primary Examiner.*

S. TRAUB, R. L. GRUDZIECKI, *Assistant Examiner.*